United States Patent
Fernando et al.

(10) Patent No.: US 10,918,179 B2
(45) Date of Patent: Feb. 16, 2021

(54) CASE FOR A MOBILE DEVICE

(71) Applicant: Philip Morris Products S.A., Neuchatel (CH)

(72) Inventors: Felix Fernando, Old Basing (GB); Laurent Manca, Sullens (CH); Stephane Antony Hedarchet, Pully (CH)

(73) Assignee: Philip Morris Products S.A., Neuchatel (CH)

( * ) Notice: Subject to any disclaimer, the term of this patent is extended or adjusted under 35 U.S.C. 154(b) by 142 days.

(21) Appl. No.: 15/569,308

(22) PCT Filed: May 6, 2016

(86) PCT No.: PCT/EP2016/060240
§ 371 (c)(1),
(2) Date: Oct. 25, 2017

(87) PCT Pub. No.: WO2016/180739
PCT Pub. Date: Nov. 17, 2016

(65) Prior Publication Data
US 2018/0116354 A1    May 3, 2018

(30) Foreign Application Priority Data

May 8, 2015 (EP) .................................... 15166930

(51) Int. Cl.
*G06F 1/16*     (2006.01)
*A24F 9/16*     (2006.01)
(Continued)

(52) U.S. Cl.
CPC ................ *A45C 11/00* (2013.01); *A24F 9/16* (2013.01); *A24F 15/18* (2013.01); *A24F 47/008* (2013.01);
(Continued)

(58) Field of Classification Search
CPC .......... A24F 47/008; A24F 9/16; A24F 15/18; A45C 15/00; A45C 1/1626;
(Continued)

(56) References Cited

U.S. PATENT DOCUMENTS 5,796,575 A * 8/1998 Podwalny ............. G06F 1/1626
                                               361/679.27
9,089,166 B1 * 7/2015 Scatterday ............. A24F 15/12
(Continued)

FOREIGN PATENT DOCUMENTS

CN    201491717 U    6/2010
CN    201846376 U    5/2011
(Continued)

OTHER PUBLICATIONS

Chinese Office Action with English translation dated Nov. 6, 2019 in corresponding Chinese Patent Application No. 201680022973.2, (16 pages).

(Continued)

*Primary Examiner* — Rockshana D Chowdhury
(74) *Attorney, Agent, or Firm* — Oblon, McClelland, Maier & Neustadt, L.L.P.

(57) ABSTRACT

There is provided a case for a mobile device, including a first panel and a second panel; and a hinge extending along an edge of each of the first and second panels and connecting the second panel to the first panel, the hinge including a hollow portion configured to receive an aerosol-generating device, and a hinge power connector configured to deliver electrical energy to a corresponding power connector on the aerosol-generating device when the aerosol-generating device is connected to the hinge power connector.

15 Claims, 2 Drawing Sheets

(51) Int. Cl.
*G06F 1/26* (2006.01)
*H02J 7/00* (2006.01)
*H04M 1/02* (2006.01)
*H04M 1/21* (2006.01)
*A24F 15/18* (2006.01)
*A24F 47/00* (2020.01)
*A45C 11/00* (2006.01)
*A45C 13/00* (2006.01)
*A45C 15/00* (2006.01)
*H04M 1/725* (2006.01)

(52) U.S. Cl.
CPC ............ *A45C 13/005* (2013.01); *A45C 15/00* (2013.01); *G06F 1/1626* (2013.01); *G06F 1/1628* (2013.01); *G06F 1/1632* (2013.01); *G06F 1/266* (2013.01); *H04M 1/21* (2013.01); *H04M 1/7253* (2013.01); *A45C 2011/002* (2013.01); *A45C 2011/003* (2013.01); *G06F 2200/1632* (2013.01); *G06F 2200/1633* (2013.01); *H02J 7/0042* (2013.01); *H04M 1/0214* (2013.01)

(58) Field of Classification Search
CPC ........ A45C 2011/002; A45C 2011/003; A45C 3/005; A45C 11/00; A45C 13/005; G06F 1/1628; G06F 1/1632; G06F 1/1616; G06F 1/266; G06F 2200/1632; G06F 2200/1633; G06F 1/1626; H04M 1/21; H04M 1/7253; H04M 1/0214; H04N 1/0214; H02J 7/0042
See application file for complete search history.

(56) References Cited

U.S. PATENT DOCUMENTS

| | | | | |
|---|---|---|---|---|
| 9,395,753 | B2 * | 7/2016 | Amano | G06F 1/1626 |
| 9,433,242 | B1 * | 9/2016 | Buffone | A24F 15/18 |
| 2010/0313901 | A1 * | 12/2010 | Fernando | H02J 7/0027 |
| | | | | 131/330 |
| 2014/0020697 | A1 * | 1/2014 | Liu | H02J 50/40 |
| | | | | 131/329 |
| 2014/0035511 | A1 * | 2/2014 | Ferber | H02J 7/0042 |
| | | | | 320/103 |
| 2014/0083443 | A1 | 3/2014 | Liu | |
| 2014/0097103 | A1 * | 4/2014 | Cameron | A24F 47/008 |
| | | | | 206/38 |
| 2014/0246035 | A1 | 9/2014 | Minskoff et al. | |
| 2014/0374289 | A1 * | 12/2014 | Liu | A24F 15/12 |
| | | | | 206/268 |
| 2015/0097513 | A1 * | 4/2015 | Liberti | A24F 47/00 |
| | | | | 320/103 |
| 2015/0101940 | A1 * | 4/2015 | Ash | H04M 1/21 |
| | | | | 206/216 |
| 2015/0245656 | A1 * | 9/2015 | Memari | A24F 15/12 |
| | | | | 206/242 |

FOREIGN PATENT DOCUMENTS

| | | | | |
|---|---|---|---|---|
| GB | 2 399 984 A | | 9/2004 | |
| GB | 2 483 309 A | | 3/2012 | |
| GB | 2519317 A | * | 4/2015 | ............. H04M 1/21 |
| JP | 11-252226 A | | 9/1999 | |
| KR | 10-2012-0124194 A | | 11/2012 | |
| RU | 2 509 516 C2 | | 6/2011 | |
| WO | 2014/125483 A1 | | 8/2014 | |
| WO | WO 2014/195688 A1 | | 12/2014 | |
| WO | 2015/050981 A1 | | 4/2015 | |

OTHER PUBLICATIONS

International Search Report and Written Opinion dated Aug. 23, 2016 in PCT/EP2016/060240, filed May 6, 2016.
Russian Notice of Allowance with English translation dated Aug. 29, 2019 in corresponding Russian Patent Application No. 2017135233, (16 pages).
Japanese Office Action dated Apr. 20, 2020 in Japanese Patent Application No. 2018-509995 (with English translation), 9 pages.

* cited by examiner

CASE FOR A MOBILE DEVICE

The present invention relates to a case for a mobile device and an aerosol-generating device.

One type of aerosol-generating device is an electrically operated smoking device. Handheld electrically operated smoking devices comprising a battery, control electronics and an electric heater for heating an aerosol-generating substrate are known. In some cases, the aerosol-generating substrate may be part of the aerosol-generating device. In other examples, the aerosol-generating substrate may form part of a replaceable aerosol-generating article that is combined with an aerosol-generating device housing the battery and control electronics to form an electrically operated smoking system. In those examples in which an aerosol-generating article is used with an aerosol-generating device the electric heater may form part of the aerosol-generating device or part of the aerosol-generating article. Alternatively, the electric heater may be provided separately from the aerosol-generating device and the aerosol-generating article, in which case the heater, the device and the article are combined to form the electrically operated smoking system.

Although aerosol-generating devices are designed to be portable so that a consumer can carry the device with them, aerosol-generating devices may be fragile, particularly those devices comprising control electronics. Therefore, in some cases a consumer may choose to carry an aerosol-generating device in a carry case to protect the device when not in use. However, a carry case for an aerosol-generating device inevitably increases the size and weight of the device, which may make the carry case undesirable or impractical for some consumers.

It would be desirable to provide a means for protecting an aerosol-generating device when the device is not in use and which mitigates at least some of the disadvantages associated with a conventional carry case.

According to a first aspect of the present invention there is provided a case for a mobile device, the case comprising a first panel and a second panel, and a hinge extending along an edge of each of the first and second panels and connecting the second panel to the first panel. The hinge comprises a hollow portion configured to receive an aerosol-generating device. The hinge further comprises a hinge power connector configured to deliver electrical energy to a corresponding power connector on the aerosol-generating device when connected to the hinge power connector.

According to a second aspect of the present invention there is provided a case for a mobile device, the case comprising a first panel and a second panel, and a hinge extending along an edge of each of the first and second panels and connecting the second panel to the first panel. The hinge comprises a hollow portion configured to receive an aerosol-generating device. The hinge may further comprise a hinge power connector configured to deliver electrical energy to a corresponding power connector on the aerosol-generating device when connected to the hinge power connector.

The preferred and optional features described herein may be applied to both aspects of the present invention.

As used herein, the term "aerosol-generating device" refers to a device for facilitating the release of volatile compounds from an aerosol-generating substrate, wherein the volatile compounds can form an aerosol. In certain embodiments, the aerosol-generating device may heat the aerosol-generating substrate to facilitate the release of the volatile compounds. The aerosol-generating device may be an electrically operated aerosol-generating device. An electrically operated aerosol-generating device may use an electric heater to heat the aerosol-generating substrate.

A case according to the present invention functions as a case to carry and protect both a mobile device and an aerosol-generating device. A case according to the present invention may therefore provide a convenient manner in which a consumer can carry an aerosol-generating device with them when not using the device. In particular, since many consumers may already carry a mobile device with them in a conventional case for a mobile device, the case according to the present invention can eliminate the need for a separate case for an aerosol-generating device by replacing a conventional case for a mobile device and a conventional carry case for an aerosol-generating device with a single, combined case.

A case according to the present invention finds particular application as a case for a mobile device and an electrically operated aerosol-generating device. Advantageously, the hinge further comprises a hinge power connector configured to deliver electrical energy to a corresponding power connector on the aerosol-generating device when the aerosol-generating device power connector is connected to the hinge power connector.

The hinge power connector may comprise a wireless hinge power connector for wirelessly delivery electrical energy to the aerosol-generating device power connector. For example, the wireless hinge power connector may comprise an induction coil.

Additionally, or alternatively, the hinge power connector may comprise at least one hinge power electrical contact for contacting at least one aerosol-generating device power electrical contact and delivering electrical energy to the aerosol-generating device. The at least one hinge power electrical contact may form part of a standardised electrical connection configured for power transfer, such as USB-A, USB-B, USB-C, USB-mini, USB-micro, SD, miniSD, and microSD. Alternatively, the at least one hinge power electrical contact may comprise a coaxial power connector.

The case may further comprise a case supply of electrical energy configured to deliver electrical energy to the corresponding aerosol-generating device power connector when connected to the hinge power connector. The case supply of electrical energy may comprise at least one battery. At least one of the first and second panels may comprise the case supply of electrical energy. For example, the case supply of electrical energy may comprise one or more substantially planar batteries integrated into one of the first and second panels. The case supply of electrically energy may comprise a first substantially planar battery integrated into the first panel and a second substantially planar battery integrated into the second panel. Integrating first and second substantially planar batteries into the first and second panels can reinforce the first and second panels and provide further protection against damage to the mobile device and the aerosol-generating device when each is received within the case.

Additionally, or alternatively, the case may comprise an external power connector for receiving electrical energy from an external supply of electrical energy and delivering the electrical energy to the aerosol-generating device via the hinge power connector and the aerosol-generating device power connector. In those embodiments in which the case comprises a case supply of electrically energy, the external power connector may be additionally or alternatively configured to receive electrical energy from an external supply of electrical energy and deliver the electrical energy to the case supply of electrical energy for recharging the case supply of electrical energy.

In any of the embodiments described above, one of the first and second panels may comprise a panel power connector configured to deliver electrical energy to a corresponding power connector on a mobile device when the mobile device is connected to the panel power connector.

The panel power connector may comprise a wireless panel power connector for wirelessly delivering electrical energy to the mobile device power connector. For example, the wireless panel power connector may comprise an induction coil.

Additionally, or alternatively, the panel power connector may comprise at least one panel power electrical contact for contacting at least one mobile device power electrical contact and delivering electrical energy to the mobile. The at least one panel power electrical contact may form part of a standardised electrical connection configured for power transfer, such as USB-A, USB-B, USB-C, USB-mini, USB-micro, SD, miniSD, and microSD. Alternatively, the at least one panel power electrical contact may comprise a coaxial power connector.

The case may further comprise a case supply of electrical energy configured to deliver electrical energy to the corresponding mobile device power connector when connected to the panel power connector. The case supply of electrical energy may comprise at least one battery. At least one of the first and second panels may comprise the case supply of electrical energy. For example, the case supply of electrical energy may comprise one or more substantially planar batteries integrated into one of the first and second panels. The case supply of electrically energy may comprise a first substantially planar battery integrated into the first panel and a second substantially planar battery integrated into the second panel. Integrating first and second substantially planar batteries into the first and second panels can reinforce the first and second panels and provide further protection against damage to the mobile device and the aerosol-generating device when each is received within the case.

Preferably, the case supply of electrical energy is also configured to deliver electrical energy to a corresponding power connector on an aerosol-generating device when connected to a hinge power connector, as described above. In such embodiments, the case supply of electrical energy may comprise a battery configured to supply electrical energy to both of the hinge power connector and the panel power connector. Alternatively, the case supply of electrical energy may comprise first and second batteries configured to supply electrical energy to the hinge power connector and the panel power connector respectively. The battery, or the first and second batteries, may be substantially planar and integrated into one or both of the first and second panels.

In any of the embodiments described above in which the case supply of electrical energy comprises one or more batteries, each battery may be a rechargeable battery. Each battery may comprise a Nickel-metal hydride battery, a Nickel cadmium battery, or a Lithium based battery, for example a Lithium-Cobalt, a Lithium-Iron-Phosphate or a Lithium-Polymer battery.

The case may comprise an external power connector for receiving electrical energy from an external supply of electrical energy and delivering the electrical energy to the mobile device via the panel power connector and the mobile device power connector. In those embodiments in which the case comprises a case supply of electrically energy, the external power connector may be additionally or alternatively configured to receive electrical energy from an external supply of electrical energy and deliver the electrical energy to the case supply of electrical energy for recharging the case supply of electrical energy. In those embodiments in which the case comprises a hinge power connector for delivery electrical energy to a corresponding power connector on the aerosol-generating device, the external power connector may also be configured to receive electrical energy from an external supply of electrical energy and deliver the electrical energy to the aerosol-generating device via the hinge power connector and the aerosol-generating device power connector, as described above.

In any of the embodiments described above in which the case comprises an external power connector, the external power connector may comprise a wireless external power connector for wirelessly receiving electrical energy from an external supply of electrical energy. For example, the wireless external power connector may comprise an induction coil.

Additionally, or alternatively, the external power connector may comprise at least one external power electrical contact forming part of a standardised electrical connection configured for power transfer, such as USB-A, USB-B, USB-C, USB-mini, USB-micro, SD, miniSD, and microSD. Alternatively, the at least one external power electrical contact may comprise a coaxial power connector.

In any of the embodiments described above, the case may further comprise an electrical controller configured to control the flow of electrical energy between different components of the case.

In those embodiments in which the case comprises a case supply of electrical energy and a hinge power connector, the electrical controller may be configured to control a flow of electrical energy from the case supply of electrical energy to the aerosol-generating device via the hinge power connector and the corresponding power connector on the aerosol-generating device.

Additionally, or alternatively, in those embodiments in which the case comprises a case supply of electrical energy and a panel power connector, the electrical controller may be configured to control a flow of electrical energy from the case supply of electrical energy to the mobile device via the panel power connector and the corresponding power connector on the mobile device.

Additionally, or alternatively, in those embodiments in which the case comprises both a hinge power connector and a panel power connector, the electrical controller may be configured to control a flow of electrical energy between the aerosol-generating device and the mobile device via the hinge power connector and the panel power connector. For example, in those embodiments in which the mobile device comprises a mobile device battery, the electrical controller may be configured to control a flow of electrical energy from the mobile device battery to the aerosol-generating device via the panel power connector and the hinge power connector.

Additionally, or alternatively, in those embodiments in which the case comprises an external power connector, the electrical controller may be configured to control the flow of electrical energy received from an external supply of electrical energy via the external power connector to at least one of a hinge power connector, a panel power connector, and a case supply of electrical energy, each as described above.

In any of the embodiments described above, the hinge may comprise a hinge data connector configured to connect to a corresponding data connector on the aerosol-generating device. The hinge data connector may support data transfer to the aerosol-generating device, from the aerosol-generating device, or both.

The hinge data connector may comprise a wireless connector for establishing a wireless connection with the aerosol-generating device data connector. For example, the hinge data connector may be a wireless connector configured to communicate with a wireless aerosol-generating device data connector using at least one wireless protocol selected from Near Field Communication, Bluetooth, ZigBee, Wi-Fi, and Ultra-wideband.

Additionally, or alternatively, the hinge data connector may comprise at least one hinge data electrical contact for contacting at least one data electrical contact forming part of the corresponding data connector of the aerosol-generating device. For example, the at least one hinge data electrical contact may form part of a standardised electrical connection selected from USB-A, USB-B, USB-C, USB-mini, USB-micro, SD, miniSD, and microSD. In those embodiments in which the case comprises a hinge power connector comprising at least one hinge power electrical contact, the at least one hinge data electrical contact and the at least one hinge power electrical contact may both form part of a combined hinge power and data connector. The combined hinge power and data connector may comprise any of the standardised electrical connections described above.

In any of the embodiments described above, one of the first and second panels may comprise a panel data connector configured to connect to a corresponding data connector on the mobile device. The panel data connector may support data transfer to the mobile device, from the mobile device, or both.

The panel data connector may comprise a wireless connector for establishing a wireless connection with the mobile device data connector. For example, the panel data connector may be a wireless connector configured to communicate with a wireless mobile device data connector using at least one wireless protocol selected from Near Field Communication, Bluetooth, ZigBee, Wi-Fi, and Ultra-wideband.

Additionally, or alternatively, the panel data connector may comprise at least one panel data electrical contact for contacting at least one data electrical contact forming part of the corresponding data connector of the mobile device. For example, the at least one panel data electrical contact may form part of a standardised electrical connection selected from USB-A, USB-B, USB-C, USB-mini, USB-micro, SD, miniSD, and microSD. In those embodiments in which the case comprises a panel power connector comprising at least one panel power electrical contact, the at least one panel data electrical contact and the at least one panel power electrical contact may both form part of a combined panel power and data connector. The combined panel power and data connector may comprise any of the standardised electrical connections described above.

In those embodiments in which the case comprises both a hinge data connector and a panel data connector, the case may be configured to provide data communication between an aerosol-generating device and a mobile device via the hinge data connector and the panel data connector. The data communication between the hinge data connector and the panel data connector may be direct. Alternatively, the case may further comprise a data controller configured to control the data communication. Data communication between the mobile device and the aerosol-generating device via the panel data connector and the hinge data connector may enable the mobile device to receive usage data from the aerosol-generating device. Additionally, or alternatively, data communication between the mobile device and the aerosol-generating device via the panel data connector and the hinge data connector may enable control of the aerosol-generating device using one or more software applications on the mobile device. For example, the mobile device may be used to configure one or more operational settings on the aerosol-generating device, such as a predetermined aerosol-generating profile. Additionally, or alternatively, a consumer input on the mobile device may authenticate the consumer and communicate such authentication to the aerosol-generating device to enable use of the aerosol-generating device.

In any of the embodiments in which the case comprises at least one of a hinge data connector and a panel data connector, the case may further comprise an external data connector configured to connect to a corresponding data connector on an external device, wherein the case is configured to provide data communication between the external device and at least one of the aerosol-generating device and the mobile device via the external data connector and at least one of the hinge data connector and the panel data connector.

In any of the embodiments described above in which the case comprises at least one of a hinge data connector, a panel data connector and an external data connector, the case may comprise at least one data storage device. The at least one data storage device may be configured to store data received from at least one of the aerosol-generating device, the mobile device and an external device via at least one of the hinge data connector, the panel data connector and the external data connector. Additionally, or alternatively, the at least one data storage device may be configured to store data for transmission to at least one of the aerosol-generating device, the mobile device and an external device via at least one of the hinge data connector, the panel data connector and the external data connector. For example, the at least one data storage device may be configured to receive and store usage data from the aerosol-generating device via the hinge power connector for subsequent transmission to an external device when the external device is connected to the external data connector.

In any of the embodiments described above, the case may further comprise a cradle provided on one of the first and second panels and configured to retain a mobile device within the case. For example, the cradle may be shaped and sized to substantially enclose a periphery of a mobile device to retain the mobile device within the case with an interference fit.

The first and second panels may be moveable about the hinge between a closed position in which the first panel overlies a first face of a mobile device and the second panel overlies a second face of the mobile device when the mobile device is received within the case, and an open position in which one of the first and second faces of the mobile device is exposed. A case comprising first and second panels arranged in this manner may be referred to a flip case or a book-style case. The case may be configured to receive a mobile device comprising at least one of a mobile phone, such as a smartphone, a phablet, or a tablet. The case may be sized to receive a specific device, or a specific type of mobile device, or may be sized to be able to receive several different devices or types of device. The case may have a width of between about 60 millimetres and about 120 millimetres. The case may have a length of between about 100 millimetres and about 170 millimetres. The length of the case refers to the direction in which the hinge extends, and the width of the case is perpendicular to the length.

At least one of the first and second panels may be substantially flat across its width and its length such that the panel is substantially planar. Both of the first and second panels may be substantially flat across their width and length such that each panel is substantially planar. Alternatively, at least one of the first and second panels may be curved across at least a portion of at least one of its width and its length such that the panel is a curved panel. Both of the first and second panels may be curved across at least a portion of at least one of their width and length such that each panel is a curved panel. In those embodiments in which at least one of the first and second panels is a curved panel, each curve in the curved panel may have a radius of curvature of between about 350 millimetres and about 810 millimetres.

The first and second panels may be formed from a substantially rigid material. Alternatively, at least one of the first and second panels may be formed from a flexible material. Forming at least one of the first and second panels from a flexible material may allow the case to accommodate different mobile devices having at least one of a different size and a different shape. Additionally, or alternatively, forming at least one of the first and second panels from a flexible material may allow the case to change shape to accommodate the changing shape of a flexible mobile device.

Preferably, the hinge is substantially cylindrical. The hollow portion may have any suitable cross-sectional shape to accommodate an aerosol-generating device. The hollow portion may have a substantially circular cross-sectional shape. The hollow portion may have a size and shape comparable to a conventional cigar or cigarette. The hollow portion may have a total length between approximately 30 millimetres and approximately 150 millimetres. The hollow portion may have an internal diameter between approximately 5 millimetres and approximately 30 millimetres.

An aerosol-generating device may be retained within the hollow portion using any suitable means. For example, the hollow portion may be shaped and sized to retain the aerosol-generating device within the hollow portion with an interference fit. Additionally, or alternatively, the case may comprise one or more magnetic materials for interacting with a magnetic or magnetisable material on the aerosol-generating device for retaining the aerosol-generating device within the hollow portion.

The case may be configured to receive an aerosol-generating device intended for use with a separate aerosol-generating article comprising an aerosol-generating substrate. For example, the aerosol-generating device may comprise a battery and an electric heater arranged in a housing, the housing configured to receive a disposable aerosol-generating article comprising a solid aerosol-generating substrate, such as a tobacco-based substrate. In such embodiments, the aerosol-generating device and the aerosol-generating article combine to form an aerosol-generating system. The case may be configured to receive one or both of the aerosol-generating device and the aerosol-generating system.

Alternatively, the aerosol-generating device may contain the aerosol-generating substrate. For example, the aerosol-generating device may comprise a battery, an electric heater and reservoir containing a liquid aerosol-generating substrate, all contained within a housing. In such embodiments, the case may be configured to receive the aerosol-generating device comprising the aerosol-generating substrate.

The invention will be further described, by way of example only, with reference to the accompanying drawings in which.

Figure 1:
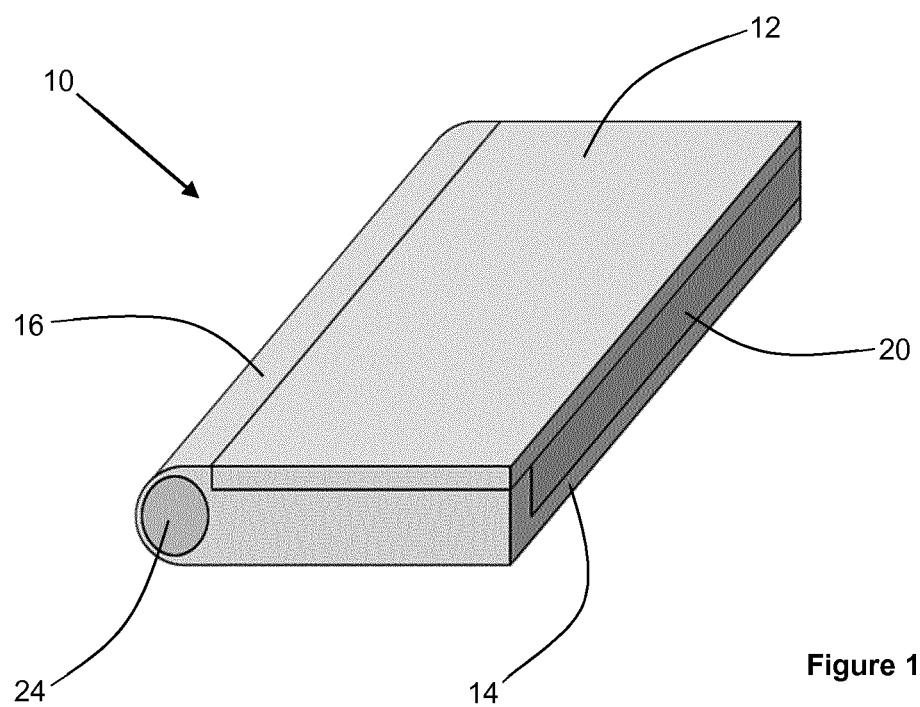
FIG. 1 shows a case in accordance with an embodiment of the present invention with the first and second panels in the closed position.
Figure 2:
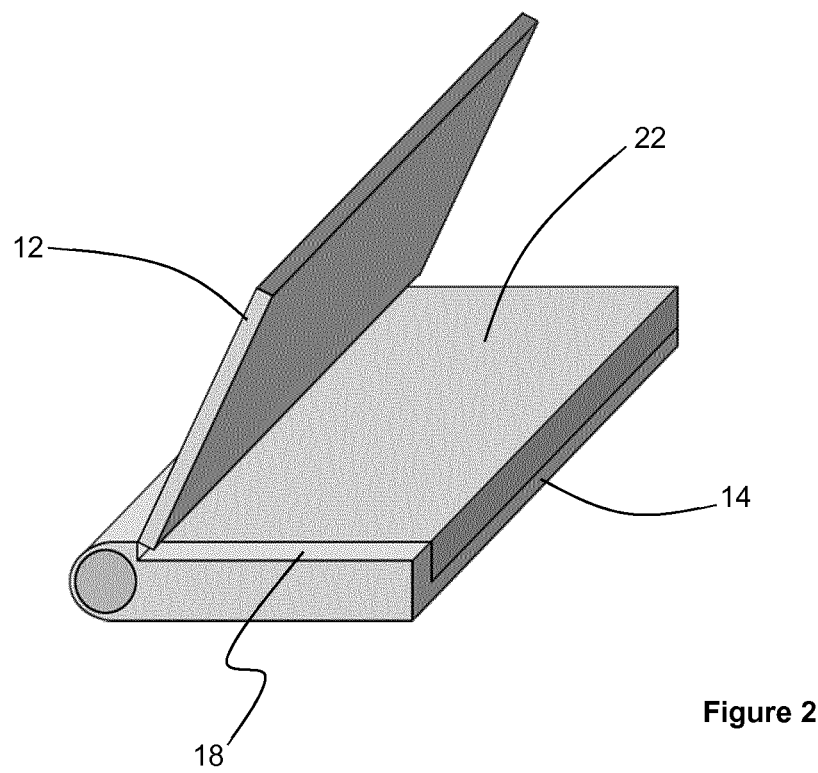
FIG. 2 shows the case of FIG. 1 with the first panel in the open position.

FIGS. 1 and 2 show a case 10 according to an embodiment of the present invention. The case 10 comprises first and second panels 12, 14 connected by a hinge 16 along an edge of each of the first and second panels 12, 14. The first panel 12 is moveable about the hinge 16 with respect to the second panel 14 between a closed position shown in FIG. 1 and an open position shown in FIG. 2.

The second panel 14 comprises a cradle 18 for receiving and retaining a mobile device 20, such as a smartphone, within the case 10. The second panel 14 overlies a back face of the mobile device 20 and the first panel 12 overlies a front face 22 of the mobile device 20 when the first panel 12 is on the closed position. The first panel 12 is moveable into the open position to expose the front face 22 of the mobile device 20 to allow a user to operate the mobile device 20 while the mobile device 20 is received within the case 10.

The hinge 16 comprises a hollow portion for receiving an aerosol-generating device 24. When the aerosol-generating device 24 and the mobile device 20 are received within the case 10 and the first panel 12 is in the closed position the aerosol-generating device 24 and the mobile device 20 are protected by the first and second panels 12, 14 and the hinge 16.

The case 10 comprises a plurality of electrical components to manage both electrical power and data transfer to and from the aerosol-generating device 24 and the mobile device 20 when each is received within the case 10. The configuration of the electrical components is illustrated schematically in FIG. 3.

Figure 3:
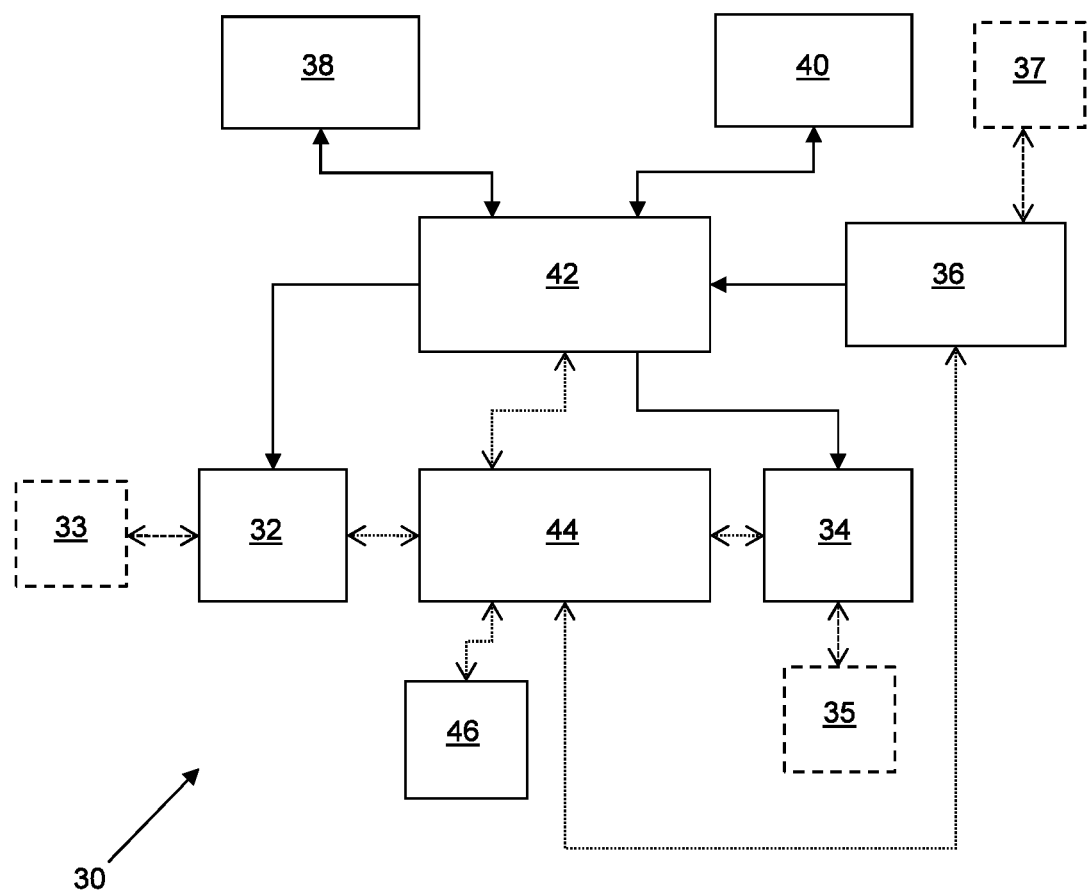
FIG. 3 shows a schematic representation of the electrical components of the case of FIG. 1.

As shown in FIG. 3, the electrical system 30 of the case 10 comprises a hinge power and data connector 32 located within the hinge 16 and configured to connect to a corresponding power and data connector 33 on the aerosol-generating device 24. The electrical system 30 also comprises a panel power and data connector 34 located within the cradle 18 on the second panel 14 and configured to connect to a corresponding power and data connector 35 on the mobile device 20. An external power and data connector 36 is also provided on the case 10 for connecting the case to at least one of an external power source and an external device 37. For example, the external power and data connector 36 may be connected to a mains charger to supply only electrical power to the case 10. Additionally, or alternatively, the external power and data connector 36 may be connected to an external device 37, such as a personal computer, to receive or transmit data, to receive electrical power, or both.

The electrical system 30 further comprises a case supply of electrical energy comprising a first rechargeable battery 38 integrated into the first panel 12 and a second rechargeable battery 40 integrated into the second panel 14. An electrical controller 42 is configured to manage the flow of electrical power to the various components of the electrical system 30. For example, the electrical controller 42 controls the flow of electrical energy received via the external power and data connector 36 to the first and second batteries 38, 40 for recharging the first and second batteries 38, 40. Additionally, the electrical controller 42 controls the flow of electrical energy from the first battery 38 to the aerosol-generating device 24 via the hinge power and data connector 32, and the flow of electrical energy from the second battery 40 to the mobile device 20 via the panel power and data connector 34. The electrical controller 42 may also control the flow of electrical energy received via the external power and data connector 36 directly to the hinge power and data connector 32 and the panel power and data connector 34. Arrows comprising solid lines shown in FIG. 3 represent the flow of electrical power within the electrical system 30.

The electrical system 30 also comprises a processor 44 that communicates with the electrical controller 42 to start or stop a desired flow of electrical energy between components of the electrical system 30. The processor 44 also functions as a data controller to manage data communication between the aerosol-generating device 24, the mobile device 20 and an external device 37 via the hinge power and data connector 32, the panel power and data connector 34 and the external power and data connector 36 respectively. The processor 44 also manages data transfer to and from a data storage device 46 provided within the case 10. For example, the data storage device 46 may receive and store usage data from the aerosol-generating device 24 via the hinge power and data connector 32 for subsequent transmission to an external device 37 when the external device is connected to the external power and data connector 36. Arrows comprising dotted lines in FIG. 3 represent data communication between components of the electrical system 30.

The invention claimed is:

1. A case for a mobile device, comprising:
   a first panel and a second panel; and
   a hinge extending along an edge of each of the first and second panels and connecting the second panel to the first panel, the hinge comprising:
   a hollow portion configured to receive an aerosol-generating device, and
   a hinge power connector configured to deliver electrical energy to a corresponding power connector on the aerosol-generating device when the
   aerosol-generating device is connected to the hinge power connector;
   wherein at least one of the first and second panels comprises a case supply of electrical energy configured to deliver electrical energy to the corresponding aerosol-generating device power connector on the aerosol-generating device when the aerosol-generating device is connected to the hinge power connector, and
   a cradle on one of the first and second panels and being configured to retain the mobile device within the case.

2. The case according to claim 1, wherein one of the first and second panels comprises a panel power connector configured to deliver electrical energy to a corresponding power connector on the mobile device when the mobile device is connected to the panel power connector.

3. The case according to claim 2, wherein at least one of the first and second panels comprises a case supply of electrical energy configured to deliver electrical energy to the corresponding power connector on the mobile device when the mobile device connected to the panel power connector.

4. The case according to claim 3, wherein the case supply of electrical energy is further configured to deliver electrical energy to the corresponding aerosol-generating device power connector when connected to the hinge power connector.

5. The case according to claim 4, further comprising an electrical controller configured to control a flow of electrical energy from the case supply of electrical energy to each of the hinge power connector and the panel power connector.

6. The case according to claim 5, wherein the electrical controller is further configured to control a flow of electrical energy between the mobile device and the aerosol-generating device via the panel power connector and the hinge power connector.

7. The case according to claim 1, further comprising an external power connector configured to receive electrical energy from an external supply of electrical energy and to deliver the received electrical energy to at least one of the hinge power connector, the panel power connector, and the case supply of electrical energy.

8. The case according to claim 1, wherein the hinge further comprises a hinge data connector configured to connect to a corresponding data connector on the aerosol-generating device.

9. The case according to claim 1, wherein one of the first and second panels comprises a panel data connector configured to connect to a corresponding data connector on the mobile device.

10. The case according to claim 8, wherein the case is configured to provide data communication between the aerosol-generating device and a mobile device via the hinge data connector.

11. The case according to claim 9, wherein the case is configured to provide data communication between the aerosol-generating device and a mobile device via the panel data connector.

12. The case according to claim 8, further comprising an external data connector configured to connect to a corresponding data connector on an external device, wherein the case is configured to provide data communication between the external device and at least one of the aerosol-generating device and the mobile device via the external data connector.

13. The case according to claim 9, further comprising an external data connector configured to connect to a corresponding data connector on an external device, wherein the case is configured to provide data communication between the external device and at least one of the aerosol-generating device and the mobile device via the external data connector and at least one of the hinge data connector and the panel data connector.

14. The case according to claim 10, further comprising an external data connector configured to connect to a corresponding data connector on an external device, wherein the case is configured to provide the data communication between the external device and at least one of the aerosol-generating device and the mobile device via the external data connector and at least one of the hinge data connector and the panel data connector.

15. The case according to claim 1, wherein the first and second panels are moveable about the hinge between a closed position in which the first panel overlies a first face of the mobile device and the second panel overlies a second face of the mobile device when the mobile device is received within the case, and an open position in which one of the first and second faces of the mobile device is exposed.

* * * * *